United States Patent
Fukushima

(10) Patent No.: US 9,338,272 B2
(45) Date of Patent: May 10, 2016

(54) COMMUNICATION APPARATUS THAT DETECTS IMPROPER CONNECTION OF CABLE, CONTROL METHOD THEREFOR, AND STORAGE MEDIUM

(71) Applicant: CANON KABUSHIKI KAISHA, Tokyo (JP)

(72) Inventor: Michio Fukushima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/670,630

(22) Filed: Mar. 27, 2015

(65) Prior Publication Data

US 2015/0281419 A1    Oct. 1, 2015

(30) Foreign Application Priority Data

Mar. 31, 2014    (JP) .................. 2014-072492

(51) Int. Cl.
| | |
|---|---|
| H04M 11/00 | (2006.01) |
| H04M 1/00 | (2006.01) |
| H04M 1/24 | (2006.01) |
| H04M 19/08 | (2006.01) |
| H04L 12/26 | (2006.01) |

(52) U.S. Cl.
CPC .............. *H04M 1/24* (2013.01); *H04L 43/0811* (2013.01); *H04M 19/08* (2013.01)

(58) Field of Classification Search
CPC ................ H04M 1/82; H04M 11/006; H04M 2203/2066; H04M 3/08; H04M 3/22; H04M 3/56; H04N 1/00209; H04N 1/32704; H04N 1/32708; H04N 1/32715; H04N 1/32717

USPC ............ 379/100.01, 100.02, 100.05, 100.16, 379/100.12, 100.15, 100.17, 102.04, 379/399.01, 413, 413.02, 413.03
See application file for complete search history.

(56) References Cited

U.S. PATENT DOCUMENTS

| | | | | | |
|---|---|---|---|---|---|
| 5,343,516 | A | * | 8/1994 | Callele | H04M 11/06 379/142.15 |
| 7,489,776 | B2 | * | 2/2009 | Ito | H04M 1/82 379/399.01 |
| 8,666,026 | B1 | * | 3/2014 | Brethour | H04M 3/56 361/1 |
| 2005/0031098 | A1 | * | 2/2005 | Ito | H04M 1/82 379/100.01 |
| 2009/0129558 | A1 | * | 5/2009 | Ishizu | H04M 1/82 379/22.03 |
| 2009/0129559 | A1 | * | 5/2009 | Fukami | H04M 11/066 379/24 |

FOREIGN PATENT DOCUMENTS

| | | |
|---|---|---|
| JP | 03022747 A | 1/1991 |
| JP | 06150396 A | 5/1994 |

* cited by examiner

*Primary Examiner* — Binh Tieu
(74) *Attorney, Agent, or Firm* — Rossi, Kimms & McDowell LLP

(57) ABSTRACT

A communication apparatus which is capable of preventing occurrence of events arising from improper connection. A voltage being applied to an interface for connecting a phone is detected, and it is determined whether or not a value of the detected voltage is equal to or greater than a value determined in advance. When it is determined that the value of the detected voltage is equal to or greater than the value determined in advance, a user is notified that there is a possibility of improper connection. When it is determined that the value of the detected voltage is not equal to or greater than the value determined in advance, a power feeding unit starts feeding power to the interface.

10 Claims, 8 Drawing Sheets

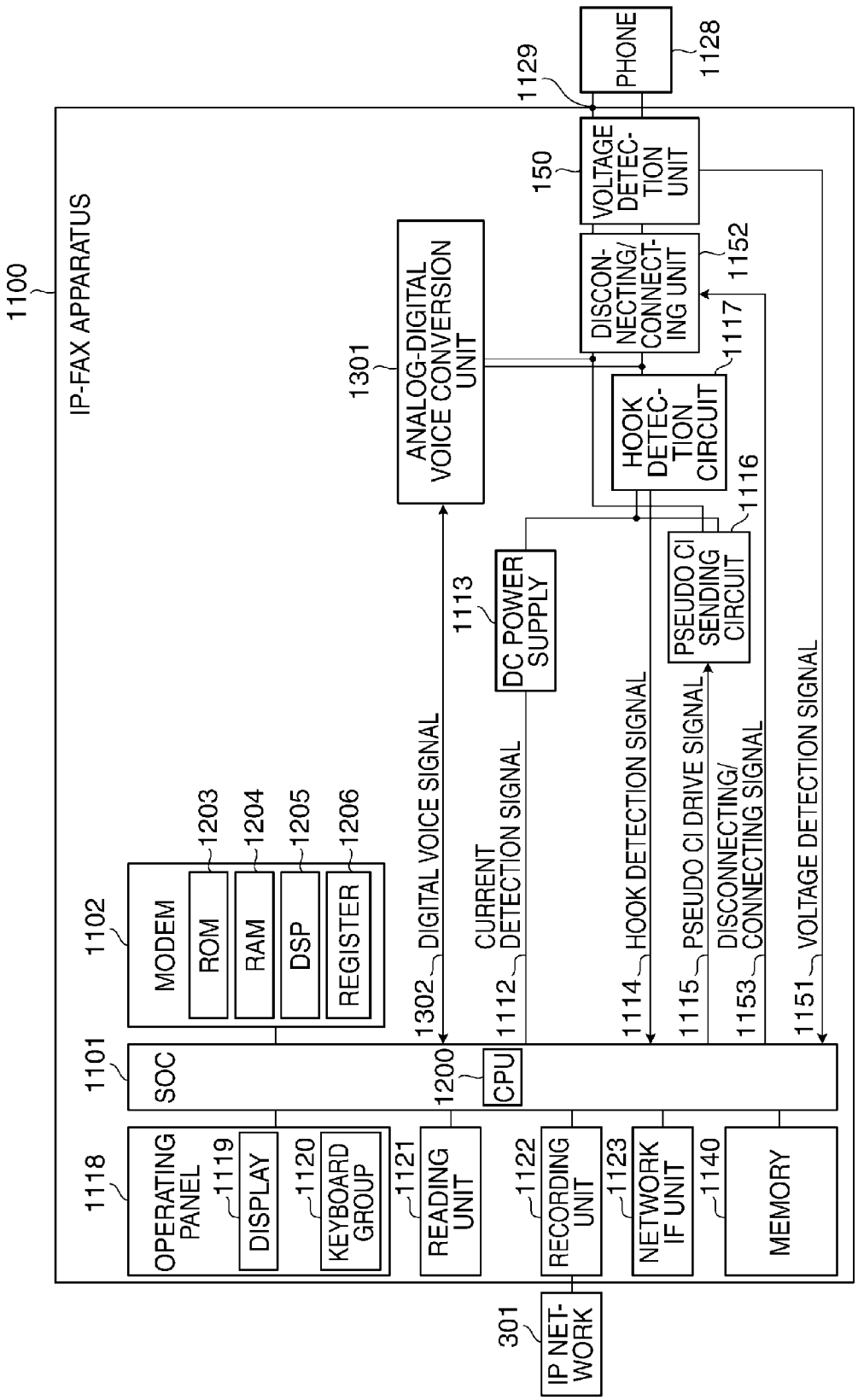

COMMUNICATION APPARATUS THAT DETECTS IMPROPER CONNECTION OF CABLE, CONTROL METHOD THEREFOR, AND STORAGE MEDIUM

BACKGROUND OF THE INVENTION

1. Field of the Invention

The present invention relates to a communication apparatus, a control method therefor, and a storage medium.

2. Description of the Related Art

Some communication apparatuses are configured to be capable of making phone calls by not only using a circuit-switched telephone network (hereafter referred to as the PSTN) with a FAX modem but also switching a line to a phone or a handset which supports the PSTN and using the PSTN with the phone or the handset when the communication apparatuses are capable of carrying out FAX communications supporting the PSTN (see, for example, Japanese Laid-Open Patent Publication (Kokai) No. H03-22747).

Such communication apparatuses are equipped with not only a modular jack for connecting to a PSTN but also a modular jack with the same shape for connecting a phone or a handset thereto.

Also, the communication apparatuses described above are generally equipped with a plurality of standby modes in which they are waiting to receive a fax or a phone call. Examples of such modes include an automatic receiving mode in which a fax is automatically received, a fax/telephone switching mode in which whether an incoming call is a fax or a phone call is determined, when the incoming call is a fax, a fax is received, and when the incoming call is a phone call, a phone is called, and a ring setting mode in which a phone is caused to ring, prompting a user to determine whether an incoming call is a fax or a phone call.

Among these modes, in the automatic receiving mode or the fax/telephone switching mode, an interface for a phone or a handset is shut off from power fed from the PSTN or a TA (terminal adaptor). In order to, in such a case, detect an off-hook state of a phone or a handset and output a phone ringing signal, there is a technique to supply power from a communication apparatus to an interface for the phone or the handset (see, for example, Japanese Laid-Open Patent Publication (Kokai) No. H06-150396).

Moreover, in recent years, IP-FAX which is the technique to replace a conventional PSTN with a network based on the IP (internet protocol) technique and offer services on a LAN or a next generation network (NGN) has come into widespread use. For IP-FAX machines which are communication apparatuses using this technique, an Ethernet (registered trademark) cable called RJ45 is used in connecting to a LAN or an NGN.

The IP-FAX machines as well are equipped with a modular jack and a circuit which supplies line voltage to a phone or a handset and outputs a phone ringing signal so that the phone or the handset which has been used on a PSTN can be used. This enables the IP FAX machines to convert analog voice data which is handled by a phone or a handset, and digital voice data which is handled by a LAN or an NGN and enables phone calls.

However, communication apparatuses for use on a PSTN are equipped with two types of modular jacks with the same shape (for a PSTN/TA and for a phone/handset), and hence there may be cases where a modular cable for connecting with a PSTN or a TA is improperly connected to the modular jack for a phone/handset, not to the modular jack for a PSTN/TA.

In IP-FAX machines, a connector called RJ45 is used for an IP-FAX interface, and the IP-FAX machines are equipped with a conventional modular jack as well as a connector for connecting a phone or a handset. Thus, there may be cases where a modular cable which connects to a PSTN or a TA may be improperly connected to this conventional modular jack.

When a modular cable which connects to a PSTN or a TA may be improperly connected to an interface for a phone or a handset, an unexpected DC 48-V voltage or voltage not less than AC 100 V which is a voltage of a phone ringing signal is applied.

Moreover, when power is being fed from a communication apparatus to an interface for a phone or a handset, power fed from a PSTN or a TA and power fed from the communication apparatus to the phone or the handset conflict with each other. If this situation arises, a power feeding circuit of the PSTN or the TA and a power feeding circuit of the phone or the handset for the communication apparatus may fail.

As described above, according to the prior arts, events such as troubles and failures may occur due to improper connection.

SUMMARY OF THE INVENTION

The present invention provides a communication apparatus and a control method therefor, which are capable of preventing occurrence of events arising from improper connection, as well as a storage medium.

Accordingly, the present invention provides a communication apparatus comprising an interface for connecting a phone, a power feeding unit configured to feed power to the interface, a detection unit configured to detect a voltage being applied to the interface, a determination unit configured to determine whether a value of the voltage detected by the detection unit is equal to or greater than a value determined in advance, a notification unit configured to, when the determination unit determines that the value of the detected voltage is equal to or greater than the value determined in advance, notify a user that there is a possibility of improper connection, and a power feeding starting unit configured to, when the determination unit determines that the value of the detected voltage is not equal to or greater than the value determined in advance, cause the power feeding unit to start feeding power.

According to the present invention, when the value of a voltage being applied to the interface for connecting the phone is equal to or greater than the value determined in advance, the user is notified that there is a possibility of improper connection, and this prevents occurrence of events arising from improper connection.

Further features of the present invention will become apparent from the following description of exemplary embodiments (with reference to the attached drawings).

BRIEF DESCRIPTION OF THE DRAWINGS

FIG. 3 is a diagram schematically showing an arrangement of an IP-FAX apparatus in FIG. 1.

DESCRIPTION OF THE EMBODIMENTS

The present invention will now be described in detail with reference to the drawings showing an embodiment thereof.

Figure 1:
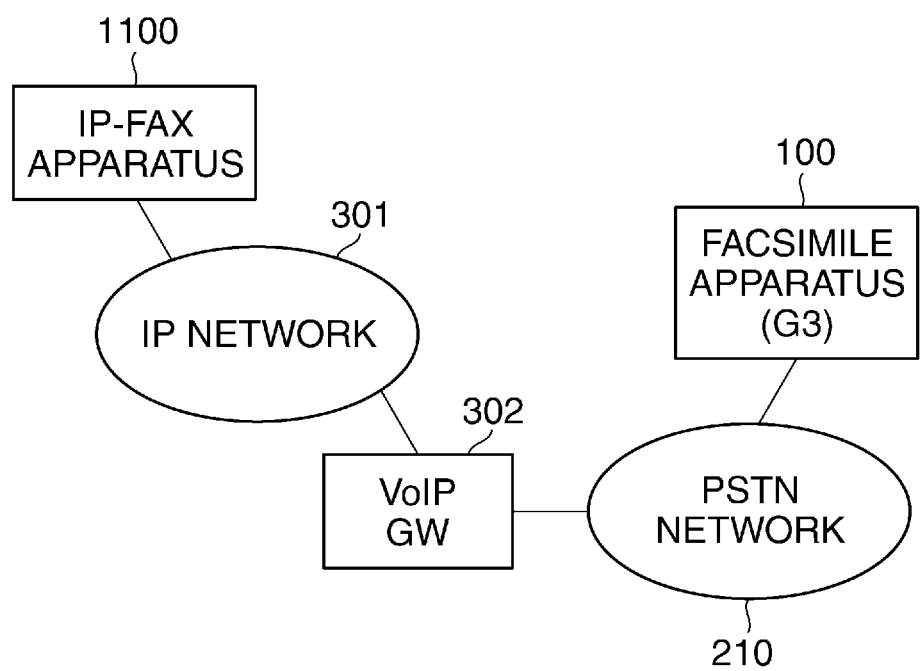
FIG. 1 is a diagram schematically showing an arrangement of a facsimile system according to an embodiment of the present invention.

FIG. 1 is a diagram schematically showing an arrangement of a facsimile system 10 according to an embodiment of the present invention.

Referring to FIG. 1, the facsimile system 10 is comprised of a facsimile apparatus 100, an IP-FAX apparatus 1100, and a VoIP gateway 302. The facsimile apparatus 100 is connected to a PSTN network 210, and the IP-FAX apparatus 1100 is connected to an IP network 301. Further, the VoIP gateway 302 is connected to the IP network 301 and the PSTN network 210.

The facsimile apparatus 100 is capable of sending and receiving images and making phone calls by way of the PSTN network 210. The IP-FAX apparatus 1100 is capable of sending and receiving images and making phone calls by way of the IP network 301.

The VoIP gateway 302 performs conversion of digital voice data handled by the IP network 301 and analog voice data handled by the PSTN network 210. By means of the VoIP gateway 302, image data is sent and received and phone calls are made between the PSTN network 210 and the IP network 301.

To use the facsimile apparatus 100 on another line such as an ISDN, a TA which connects the facsimile apparatus 100 to an ISDN network is used sometimes although this is not shown in the figure. In the present embodiment, the facsimile apparatus 100 and the IP-FAX apparatus 1100 described above correspond to communication apparatuses.

Figure 2:
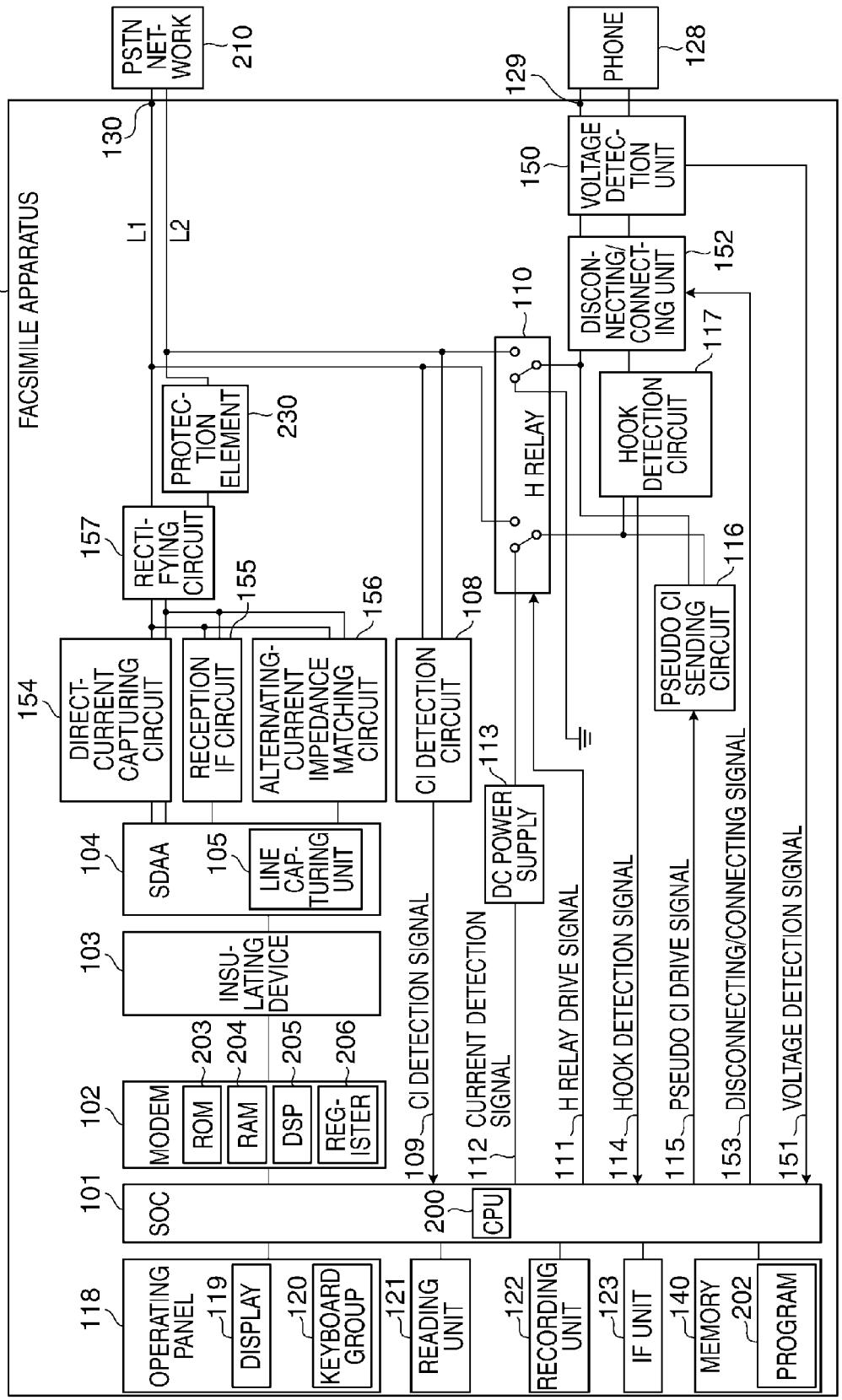
FIG. 2 is a diagram schematically showing an arrangement of a facsimile apparatus in FIG. 1.

FIG. 2 is a diagram schematically showing an arrangement of the facsimile apparatus 100 in FIG. 1.

Referring to FIG. 2, the facsimile apparatus 100 is connected to the PSTN network 210 via a communication line 130, and an outboard phone 128 is connected to the facsimile apparatus 100.

In the facsimile apparatus 100, an SOC (system-on-a-chip) 101 has a CPU 200 and controls the overall system of the facsimile apparatus 100. A memory 140 connected to the SOC 101 is a main storage unit and acts as a system work memory for the CPU 200 of the SOC 101 and stores programs for the CPU 200 to execute flowcharts, to be described later. The memory 140 also temporarily stores image data and a variety of information when, for example, facsimiles are sent and received, and stores information set by a user.

An operating panel 118, a reading unit 121, a recording unit 122, and an interface unit 123 are additionally connected to the SOC 101. The operating panel 118 has a display 119 and a keyboard group 120, which act as user interfaces.

The display 119 shows a status of the facsimile 100, a menu, and so on. The keyboard group 120 is a keyboard comprised of buttons, a 10-digit keypad, and so on which receive various instructions input from the user. The user uses this keyboard to input a variety of information such as user setting information.

The reading unit 121 reads an image off an original to generate image data. The generated image data is sent to an external device by facsimile via the communication line 130 or printed by the recording unit 122. The interface unit 123 is an interface to which various external devices are connected.

A modem 102 is connected to the SOC 101, and the modem 102 is a modulator-demodulator which operates under the control of the SOC 101.

The modem 102 carries out a modulation process using image data which is read by the reading unit 121 and will be sent by facsimile, and a demodulation process on signals received via the communication line 130. The modem 102 is also connected to an SDAA (silicon data access arrangement) 104 via an insulating device 103. The modem 102 also has a ROM 203, a RAM 204, a DSP 205, and a register 206.

The ROM 203 stores programs which are executed by the DSP 205. Programs 202 transferred from a host and the programs stored in the ROM 203 are expanded on the RAM 204. The DSP (digital signal processor) 205 executes the programs expanded on the RAM 204. The register 206 stores a status of the SDAA 104 and also stores instructions from the SOC 101.

The SDAA 104 is a semiconductor NCU (network control unit). The SDAA 104 is connected to the insulating device 103, a direct-current capturing circuit 154, a reception interface circuit 155, and an alternating current impedance matching circuit 156.

The SDAA 104 is also connected to the communication line 130 and acts as an interface between the facsimile apparatus 100 and the communication line 130. At the time of communication with an external device via the communication line 130, the SDAA 104 controls a connecting state of the communication line 130. The SDAA 104 provides the control described above under the control of the SOC 101. The SDAA 104 has a line capturing unit 105 and controls a line direct-current capturing state using the line capturing unit 105.

The phone 128 is connected to the communication line 130 via an H relay 110, to be described later, and the SDAA 104 is connected to the communication line 130 and in parallel with the phone 128.

The direct-current capturing circuit 154, which is a circuit connected to the SDAA 104 and a rectifying circuit 157 and comprised of a current source such as a transistor, is used to adjust direct-current impedance under the control of the SDAA 104 while capturing direct current by adjusting electric current of the current source. The direct-current capturing circuit 154 is used to create a line open state and send out a dial pulse which is a type of selection signal for the communication line 130.

The rectifying circuit 157 is connected to the direct-current capturing circuit 154, the reception interface circuit 155, the alternating current impedance matching circuit 156, and a protection element 230. The rectifying circuit 157, which is comprised of a diode bridge and others, rectifies a signal from the communication line 130 and transmit the rectified signal to the SDAA 104. The protection element 230 is a current protection element comprised of a fuse or the like.

The reception interface circuit 155 is a circuit for receiving, for example, reception signals of facsimiles received via the communication line 130. The alternating current impedance matching circuit 156 is a circuit for matching input impedance and output impedance in alternating current impedance during communication to each other, and in Japan, an alternating current impedance is matched to 600 ohms.

A CI detection circuit 108 is connected to the communication line 130 and detects a call signal (hereafter referred to as a "CI signal") received from the communication line 130. Upon detecting a CI signal from the communication line 130, the CI detection circuit 108 sends a CI detection signal 109 to the SOC 101. Based on the CI detection signal 109, the SOC 101 determines whether or not there is an incoming CI signal from the communication line 130.

The H relay 110 connects the onboard phone 128, which is connected thereto via a hook detection circuit 117, to a DC power supply 113 or the communication line 130. Specifically, the H relay 110 switches between a connecting state of connecting the onboard phone 128 to the communication line 130 and a disconnecting state of disconnecting the onboard phone 128 from the communication line 130. The H relay 110 is controlled by the SOC 101 using an H relay drive signal 111.

It should be noted that in the case where the phone 128 is disconnected from the communication line 130 by the H relay 110 as shown in FIG. 1, the phone 128 does not ring even when there is an incoming CI signal. This state is called a no-ring incoming state of the facsimile apparatus 100.

The DC power supply 113 corresponds to a power feeding unit which feeds power to a phone interface 129. Current is supplied to the phone 128 by feeding power to the phone interface 129. In the no-ring incoming state described above, the DC power supply 113 supplies current to the phone 128. Moreover, the DC power supply 113 is able to obtain a value of current output from itself. Also, by means of a current detection signal 112, the DC power supply 113 notifies the SOC 101 of a current value obtained by the DC power supply 113.

The hook detection circuit 117 is connected to the phone 128 and detects an off-hook state or on-hook state of the phone 128. The hook detection circuit 117 transfers a detection result indicative of the off-hook or on-hook state of the phone 128 to the SOC 101 using a hook detection signal 114. The SOC 101 determines a hook state of the phone 128 based on the hook detection signal 114.

In either of a case where the hook detection circuit 117 is connected to the communication line 130 by the H relay 110 and a case where the hook detection circuit 117 is connected to the DC power supply 113 by the H relay 110, the hook detection circuit 117 detects current passing through the phone 128. By detecting current passing through the phone 128, the hook detection circuit 117 detects the off-hook or on-hook state of the phone 128.

The phone interface 129 is a modular connector for connecting the phone 128 to the facsimile apparatus 100. Devices which are connected to the phone interface 129 should not be limited to the phone 128 but include, for example, a handset of which a connecting destination is a PSTN.

A pseudo CI sending circuit 116 is a circuit which transmits a pseudo CI drive signal 115, which it has received from the SOC 101, to the phone 128. The pseudo CI drive signal 115 is transmitted to the phone 128 so as to cause the phone 128, which is disconnected from the line, to ring when there is an incoming CI from an external device via the communication line 130.

A voltage detection unit 150 detects voltage in the phone interface 129. By means of a voltage detection signal 151, the voltage detection unit 150 informs the SOC 101 that voltage has been detected. A disconnecting/connecting unit 152 disconnects or connects the phone interface 129 in response to a disconnecting/connecting signal from the SOC 101. The disconnecting/connecting unit 152 may be a mechanical relay, an FET, or the like.

FIG. 3 is a diagram schematically showing an arrangement of the IP-FAX apparatus 1100 in FIG. 1.

Referring to FIG. 3, the IP-FAX apparatus 1100 is connected to the IP network 301, and an outboard phone 1128 is connected to the IP-FAX apparatus 1100.

An SOC (system-on-a-chip) 1101 has a CPU 1200 and controls the overall system of the IP-FAX apparatus 1100. A memory 1140 connected to the SOC 1101 is a main storage unit and acts as a system work memory for the CPU 1200 of the SOC 1101 and stores programs for the CPU 1200 to execute flowcharts, to be described later. The memory 1140 also temporarily stores image data and a variety of information at the time of, for example, IP-FAX transmission or IP-FAX reception and stores information set by a user.

An operating panel 1118, a reading unit 1121, a recording unit 1122, and a network interface unit 1123 are additionally connected to the SOC 1101. Among them, the operating panel 1118 has a display 1119 and keyboard group 1120, which act as user interfaces.

The display 1119 displays a status of the IP-FAX apparatus 1100 and menus. The keyboard group 1120 is a keyboard comprised of buttons, a 10-digit keypad, and so on which receive various instructions input from the user. The user uses this keyboard to input a variety of information such as user setting information.

The reading unit 1121 reads an image off an original to generate image data. The generated image data is transmitted to an external device by IP-FAX via a network interface unit 1123 or printed by the recording unit 1122.

A modem 1102 is connected to the SOC 1101, and the modem 1102 is a modulator-demodulator which operates under the control of the SOC 1101.

The modem 1102 carries out communications using the T.30 protocol by way of a network in IP-FAX. The modem 102 converts image data, which is read by the reading unit 1121, into digital voice data and converts digital voice data, which conforms to T.30 and is received by the network interface unit 1123, into image data. The modem 1102 has a ROM 1203, a RAM 1204, a DSP 1205, and a register 1206.

The ROM 1203 stores programs which are executed by the DSP 1205. Programs, not shown, transferred from a host and the programs stored in the ROM 1203 are expanded on the RAM 1204. The DSP 1205 executes the programs expanded on the RAM 1204. The register 1206 stores instructions from the SOC 1101.

A DC power supply 1113 feeds power to the phone 1128. The DC power supply 1113 is able to obtain a value of current output from itself. By means of a current detection signal 1112, the DC power supply 1113 also notifies the SOC 1101 of a current value obtained by the DC power supply 1113.

A hook detection circuit 1117 is connected to the phone 1128 and detects an off-hook state or on-hook state of the phone 1128 based on current supplied from the DC power supply 1113. The hook detection circuit 1117 transmits a detection circuit indicative of an off-hook state or an on-hook state of the phone 1128 to the SOC 1101 using a hook detection signal 1114. The SOC 1101 determines a hook state of the phone 1128 based on the hook detection signal 1114.

A phone interface 1129 is a modular connector which enables the phone 1128 to be attached to the IP-FAX apparatus 1100. A pseudo CI sending circuit 1116 is a circuit which sends out a pseudo CI drive signal 1115 received from the SOC 1101 to the phone 1128.

A voltage detection unit 1150 detects voltage in a phone interface 1129. By means of a voltage detection signal 1151, the voltage detection unit 1150 informs the SOC 1101 that voltage has been detected. An analog-digital voice conversion unit 1301 converts an analog voice signal from the phone 1128 into a digital voice signal 1302 which is to be sent to a network, and converts the digital voice signal 1302 received from the network into a analog voice signal which can be opened by the phone 1128.

A disconnecting/connecting unit 1152 disconnects or connects the phone interface 1129 according to a disconnecting/connecting signal 1153 from the SOC 1101. The disconnecting/connecting unit 1152 may be a mechanical relay, an FET, or the like.

A description will now be given of flowcharts, and all the flowcharts are common to the facsimile apparatus 100 and the IP-FAX apparatus 1100. Thus, in the description of each flowchart, component elements are designated by "reference numeral for a component element of the facsimile apparatus 100, reference numeral for a component element of the IP-FAX apparatus 1100" like "the CPU 200, 1200".

Figure 4A:
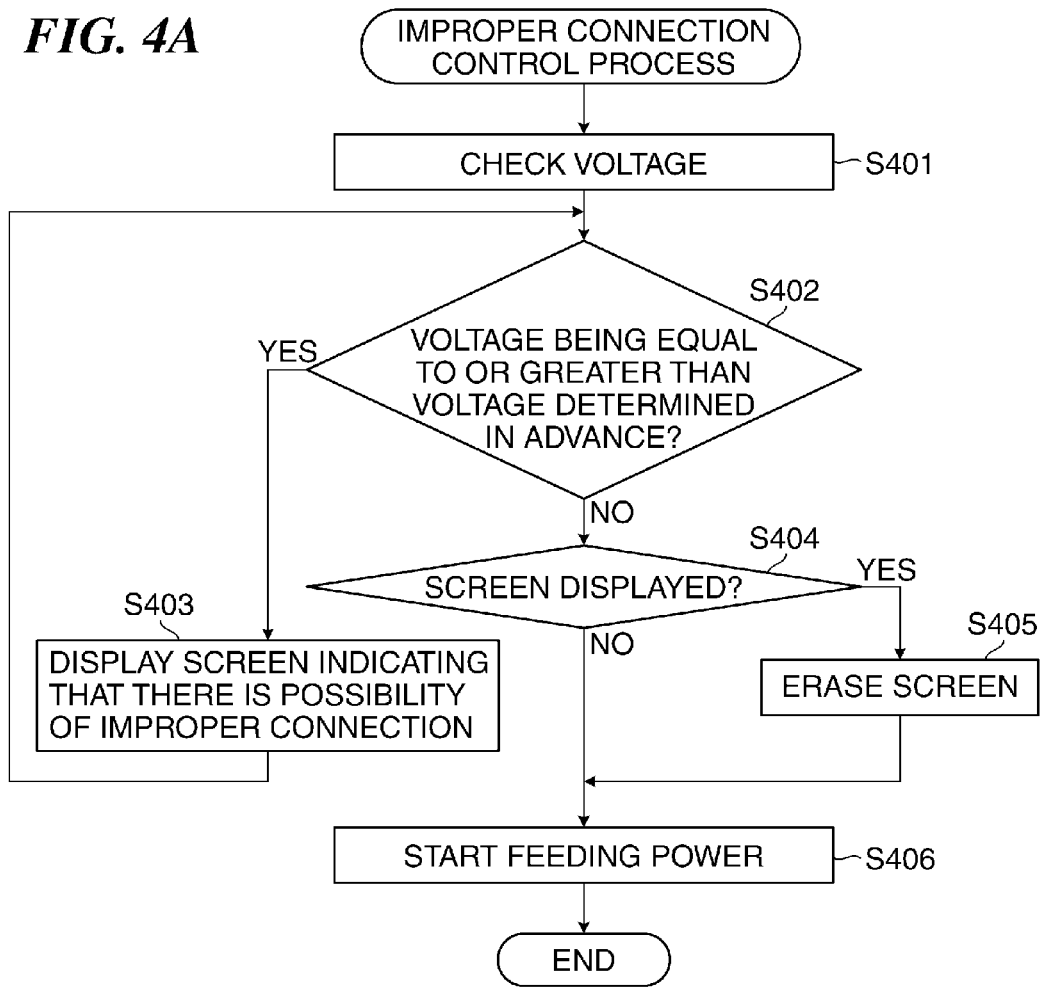
FIG. 4A is a flowchart showing the procedure of an improper connection control process which is carried out by CPUs in FIG. 2 and FIG. 3.

FIG. 4A is a flowchart showing the procedure of an improper connection control process which is carried out by the CPU 200 in FIG. 2 and the CPU 1200 in FIG. 3.

Referring to FIG. 4A, the CPU 200, 1200 causes the voltage detection unit 150, 1150 to detect a voltage in the phone interface 129, 1129 and obtain a value thereof (step S401: detection unit). The CPU 200, 1200 then determines whether or not the value of the voltage obtained by the voltage detection unit 150, 1150 is equal to or greater than a value determined in advance (step S402: determination unit).

As a result of the determination in the step S402, when the obtained value of the voltage is equal to or greater than the value determined in advance (YES in the step S402), the CPU 200, 1200 displays, for the user, a screen indicating that there is a possibility of improper connection on the display 119, 1119 (step S403: notification unit), and the process returns to the step S402.

On the other hand, as a result of the determination in the step S402, when the obtained value of the voltage is not equal to or greater than the value determined in advance (NO in the step S402), the CPU 200, 1200 determines whether or not a screen indicating that there is a possibility of improper connection was displayed in the above step S403 (step S404).

As a result of the determination in the step S404, when a screen indicating that there is a possibility of improper connection was not displayed (NO in the step S404), the CPU 200, 1200 causes the DC power supply 113, 1113 to start feeding power to the phone interface 129, 1129 (step S406: power-feeding starting unit), and terminates the present process. On the other hand, as a result of the determination in the step S404, when a screen indicating the possibility of improper connection was displayed (YES in the step S404), the CPU 200, 1200 erases this screen (step S405), and the process proceeds to step S406.

As a result of the improper connection control process in FIG. 4A, even when a modular cable connected to a public telephone network or a TA is improperly connected to the phone interface 129, 1129, no collision occurs between a power feeding circuit of the public telephone network or TA and the power feeding circuit of the facsimile apparatus 100 or the IP-FAX apparatus 1100, and this prevents occurrence of failures in the facsimile apparatus 100 and the IP-FAX apparatus 1100.

Moreover, when power feeding from the DC power supply 113, 1113 to the facsimile apparatus 100 and the IP-FAX apparatus 1100 is required, power needs to be continuously fed so as to detect a hook-up state of the phone 128, 1128.

It should be noted that the improper connection control process in FIG. 4A may be carried out when the power to the facsimile apparatus 100 and the IP-FAX apparatus 1100 is turned on and they are started.

Figure 4B:
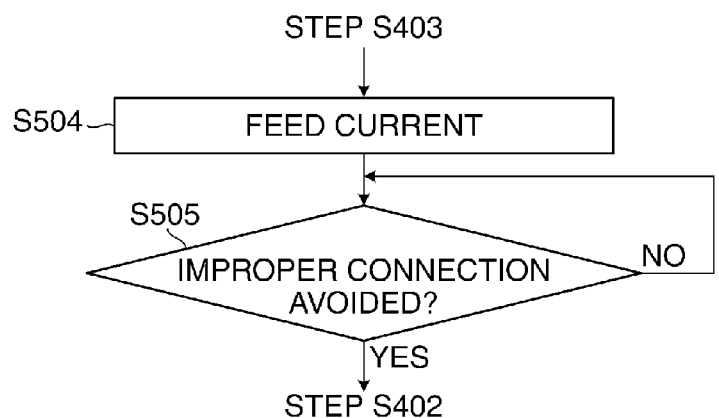
FIG. 4B is a flowchart showing a variation of FIG. 4A.

FIG. 4B is a flowchart showing a variation of FIG. 4A. The flowchart in FIG. 4B is inserted between the step S403 and the step S402 in FIG. 4A. According to this variation, when it is determined that a value of a detected voltage is equal to or greater than a value determined in advance, a current with the voltage being applied to the phone interface 129, 1129 is fed.

First, when a screen indicating that there is a possibility of improper connection is displayed on the display 119, 1119 for the user in the step 403 described above, the CPU 200, 1200 feeds a current with a voltage being applied to the phone interface 120, 1120 (step S504).

To feed a current here, a method in which a resistance value is decreased using the DC power supply 113, 1113, or a method in which a current is passed using an additional system which decreases a resistance value may be used.

Next, when the user who has seen the screen displayed on the display 119, 1119 in the step S403 avoids improper connection (YES in step S505), the process returns to the step S402 described above. The result of the determination in the step S505 as to whether or not improper connection has been avoided is positive when the user who has seen the screen inputs avoidance of improper connection by way of the display 119, 1119.

In the improper connection control process in FIG. 4B, by feeding a current with a voltage being applied to the phone interface 129, 1129, it is determined that a telephone line on a public telephone network or a TA is in use. In this case, a failure caused by application of DC 48 V from the public telephone network or TA cannot be prevented, but a voltage not less than AC 100 V, which is a voltage of a call signal causing a phone to ring, is no longer applied to the phone interface 129, 1129, and this prevents occurrence of failures in the facsimile apparatus 100 and the IP-FAX apparatus 1100.

Figure 5:
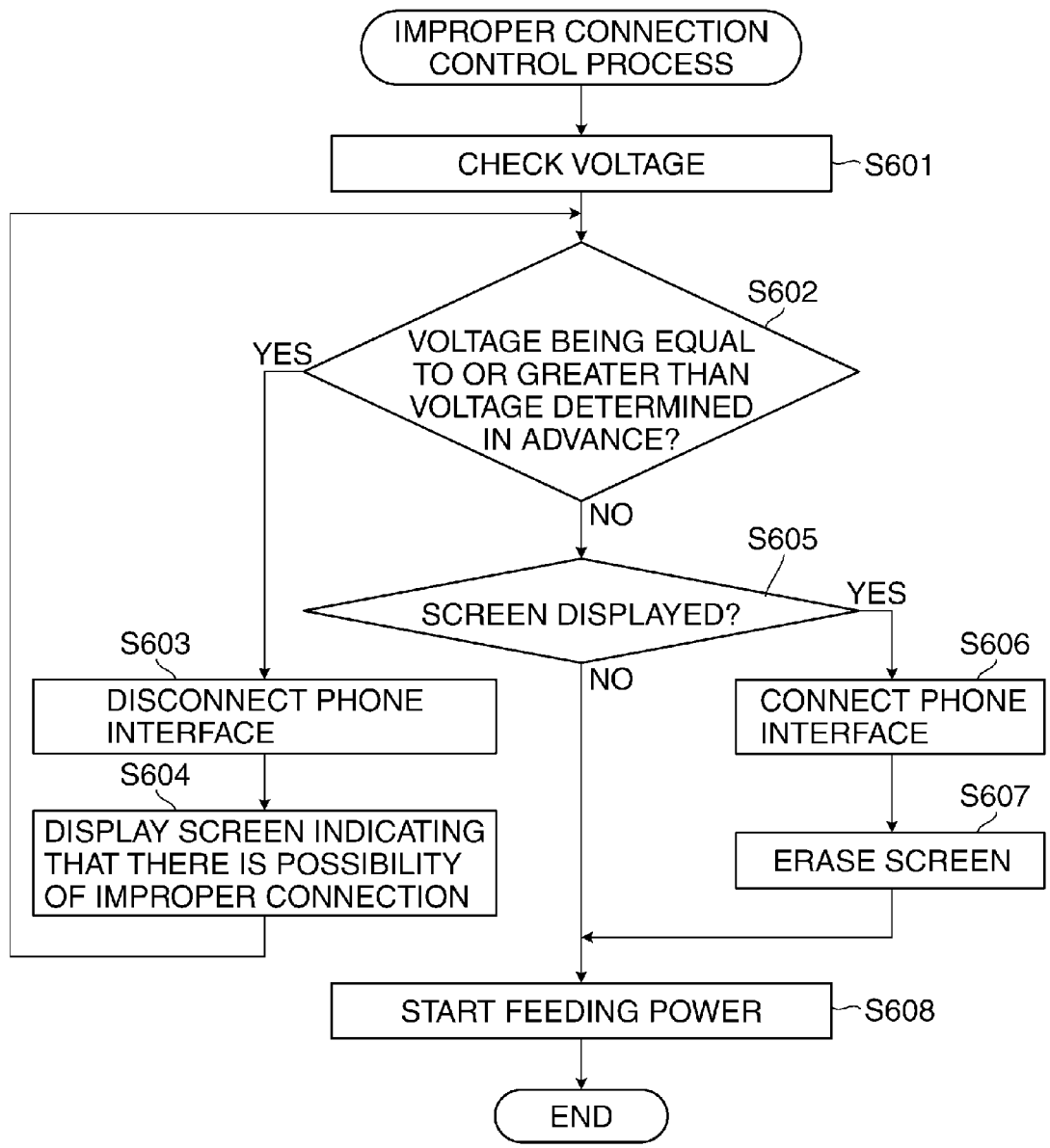
FIG. 5 is a flowchart showing the procedure of an improper connection control process which is carried out by the CPUs in FIG. 2 and FIG. 3.

FIG. 5 is a flowchart showing the procedure of an improper connection control process which is carried out by the CPU 200 in FIG. 2 and the CPU 1200 in FIG. 3.

In the improper connection control process in FIG. 5, when a value of a voltage detected in the phone interface 129, 1129 is equal to or greater than a value determined in advance, the phone interface 129, 1129 is electrically disconnected.

Referring to FIG. 5, first, the CPU 200, 1200 causes the voltage detection unit 150, 1150 to detect a voltage in the phone interface 129, 1129 and as a result, ascertain a value thereof (step S601: detection unit). The CPU 200, 1200 then determines whether or not the value of the voltage obtained by the voltage detection unit 150, 1150 is equal to or greater than a value determined in advance (step S602: determination unit).

As a result of the determination in the step S602, when the obtained value of the voltage is equal to or greater than the value determined in advance (YES in the step S602), the CPU 200, 1200 causes the disconnecting/connecting unit 152, 1152 to disconnect the phone interface 129, 1129 (step S603). Then, the CPU 200, 1200 displays, for the user, a screen indicating that there is a possibility of improper connection on the display 119, 1119 (step S604: notification unit), and the process returns to the step S602.

On the other hand, as a result of the determination in the step S602, when the obtained value of the voltage is not equal to or greater than the value determined in advance (NO in the step S602), the CPU 200, 1200 determines whether or not a screen indicating that there is a possibility of improper connection was displayed in the above step S604 (step S605).

As a result of the determination in the step S605, when a screen indicating that there is a possibility of improper connection was not displayed (NO in the step S605), the CPU 200, 1200 starts feeding power to the phone interface 129, 1129 (step S608: power feeding starting unit) and terminates the present process.

On the other hand, as a result of the determination in the step S605, when a screen indicating that there is a possibility of improper connection was displayed (YES in the step S605), the CPU 200, 1200 causes the disconnecting/connecting unit 152, 1152 to connect the phone interface 129, 1129 (step S606) and erases the above screen (step S607), and the process proceeds to the step S608.

As a result of the improper connection control process in FIG. 5, even when a modular cable connected to a public telephone network or a TA is improperly connected to the phone interface 129, 1129, the time period for which DC 48 V is applied from the public telephone network or the TA is shortened by disconnecting the phone interface 129, 1129. As a result, a voltage not lower than AC 100 V, which is a voltage of a call signal causing a phone to ring, is no longer applied to the phone interface 129, 1129, and this prevents occurrence of failures in the facsimile apparatus 100 and the IP-FAX apparatus 1100.

Figure 6:
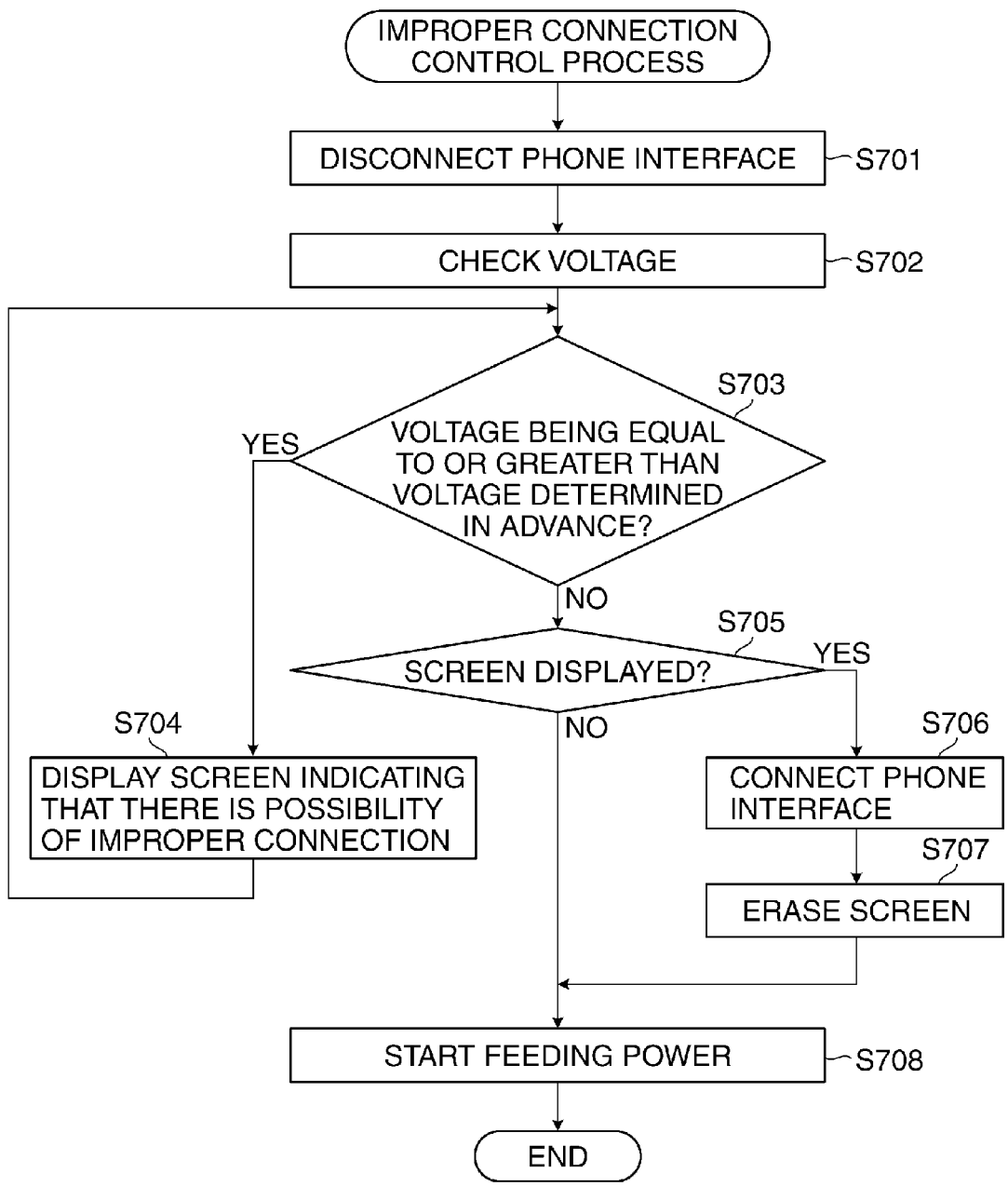
FIG. 6 is a flowchart showing the procedure of an improper connection control process which is carried out by the CPUs in FIG. 2 and FIG. 3.

FIG. 6 is a flowchart showing the procedure of an improper connection control process which is carried out by the CPU 200 in FIG. 2 and the CPU 1200 in FIG. 3.

In the improper connection control process in FIG. 6, the phone interface 129, 1129 is electrically disconnected in advance before a voltage being applied to the phone interface 129, 1129 is detected.

Referring to FIG. 6, first, the CPU 200, 1200 causes the disconnecting/connecting unit 152, 1152 to disconnect the phone interface 129, 1129 (step S701). Next, the CPU 200, 1200 causes the voltage detection unit 150, 1150 to detect a voltage in the phone interface 129, 1129 and obtain a value thereof (step S702: detection unit).

The CPU 200, 1200 then determines whether or not the value of the voltage obtained by the voltage detection unit 150, 1150 is equal to or greater than a value determined in advance (step S703: determination unit).

As a result of the determination in the step S703, when the obtained value of the voltage is equal to or greater than the value determined in advance (YES in the step S703), the CPU 200, 1200 displays, for the user, a screen indicating that there is a possibility of improper connection on the display 119, 1119 (step S704: notification unit), and the process returns to the step S703.

On the other hand, as a result of the determination in the step S703, when the obtained value of the voltage is not equal to or greater than the value determined in advance (NO in the step S703), the CPU 200, 1200 determines whether or not a screen indicating that there is a possibility of improper connection was displayed in the above step S704 (step S705).

As a result of the determination in the step S705, when a screen indicating that there is a possibility of improper connection was not displayed (NO in the step S705), the CPU 200, 1200 causes the DC power supply 113, 1113 to start feeding power to the phone interface 129, 1129 (step S708: power feeding starting unit) and terminates the present process.

On the other hand, as a result of the determination in the step S705, when a screen indicating that there is a possibility of improper connection was displayed (YES in the step S705), the CPU 200, 1200 causes the disconnecting/connecting unit 152, 1152 to connect the phone interface 129, 1129 (step S706) and erases the above screen (step S707), followed by the process proceeding to the step S708.

As a result of the improper connection control process in FIG. 6, because the phone interface 129, 1129 is disconnected in advance, DC 48 V is not applied to the phone interface 129, 1129 from a public telephone network or a TA, and a voltage not lower than AC 100 V, which is a voltage of a call signal causing a phone to ring, is no longer applied to the phone interface 129, 1129 even when a modular cable connected to the public telephone network or the TA is improperly connected to the phone interface 129, 1129, and this prevents occurrence of failures in the facsimile apparatus 100 and the IP-FAX apparatus 1100.

Figure 7:
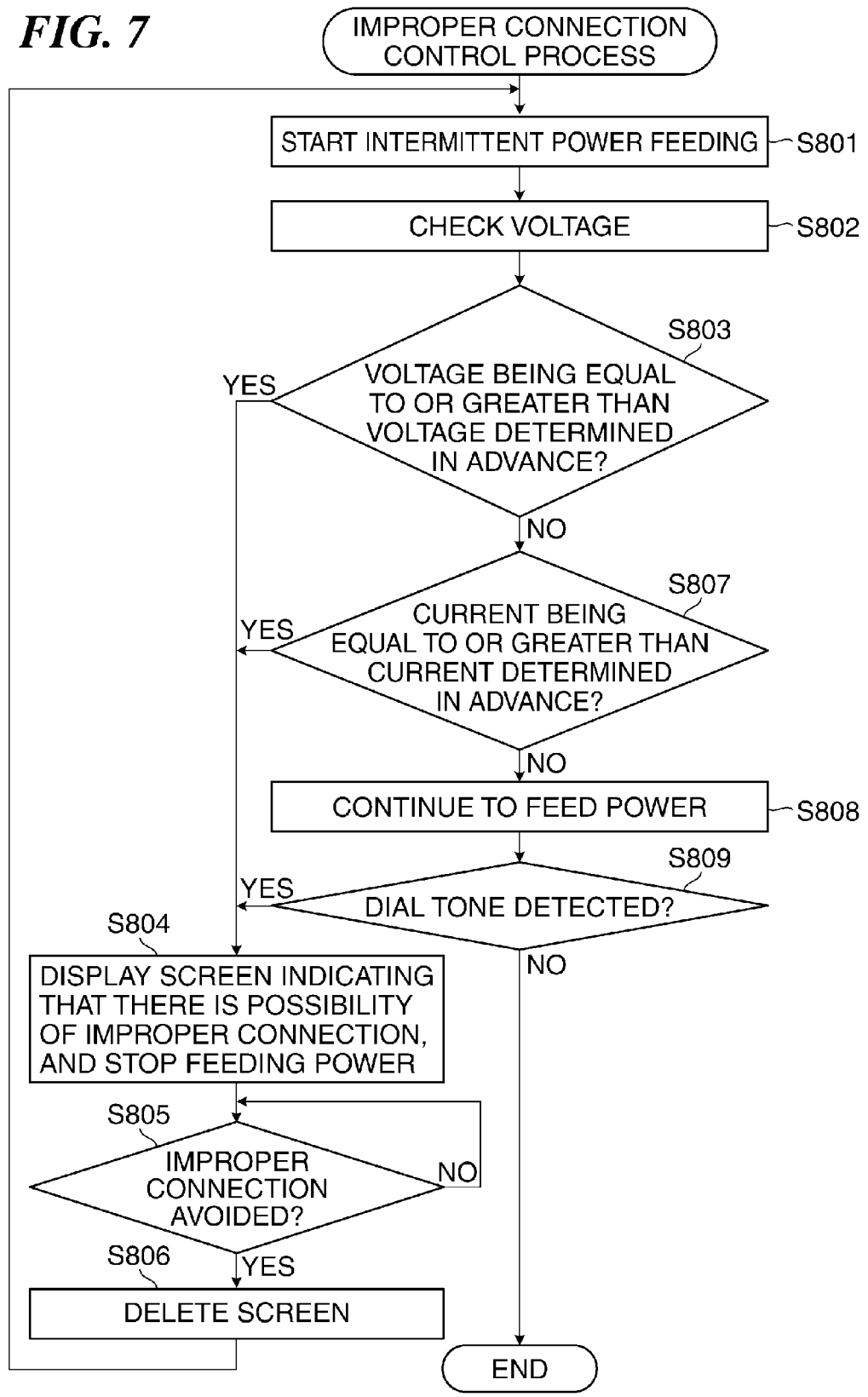
FIG. 7 is a flowchart showing the procedure of an improper connection control process which is carried out by the CPUs in FIG. 2 and FIG. 3.

FIG. 7 is a flowchart showing the procedure of an improper connection control process which is carried out by the CPU 200 in FIG. 2 and the CPU 1200 in FIG. 3.

The improper connection control process in FIG. 7 is a process which is carried out in a case where after power feeding to the phone interface 129, 1129 is started, a modular cable connected to a public telephone network or a TA is improperly connected to the phone interface 129, 1129, and DC 48 V is applied to the phone interface 129, 1129.

Referring to FIG. 7, the CPU 200, 1200 causes the DC power supply 113, 1113 to start intermittent power feeding to the phone interface 129, 1129 (step S801: intermittent feeding starting unit). This intermittent power feeding will be described later. Then, at the time when no power is fed to the phone interface 129, 1129, the CPU 200, 1200 causes the voltage detection unit 150, 1150 to detect a voltage in the phone interface 129, 1129 and obtain a value thereof (step S802: detection unit).

The CPU 200, 1200 then determines whether or not the value of the voltage obtained by the voltage detection unit 150, 1150 is equal to or greater than a value determined in advance (step S803: determination unit). As a result of the determination in the step S803, when the obtained value of the voltage is equal to or greater than the value determined in advance (YES in the step S803), the CPU 200, 1200 displays, for the user, a screen indicating that there is a possibility of improper connection on the display 119, 1119 and further stops power feeding from the DC power supply 113, 1113 (step S804: notification unit).

Next, when the user who has seen the screen displayed on the display 119, 1119 in the step S403 avoids improper connection (YES in step S805), the CPU 200, 1200 erases the screen (step S806), and the process proceeds to the step S801 described above. The result of the determination in the step S805 as to whether or not improper connection has been avoided is positive when the user who has seen the screen inputs avoidance of improper connection by way of the display 119, 1119.

On the other hand, as a result of the determination in the step S803, when the obtained value of the voltage is not equal to or greater than the value determined in advance (NO in the step S803), the CPU 200, 1200 determines whether or not a value of a current supplied from the DC power supply 113, 1113 is equal to or greater than the value determined in advance (step S807: other determination unit). The timing with which the value of the current is obtained will be described later.

When the CPU 200, 1200 determines in the step S807 that the value of the current supplied from the DC power supply 113, 1113 is equal to or greater than the value determined in advance (YES in the step S807), the process proceeds to the step S804 described above. On the other hand, as a result of the determination in the step S807, when the value of the current supplied from the DC power supply 113, 1113 is not equal to or greater than the value determined in advance (NO in the step S807), the CPU 200, 1200 continues to feed power from the DC power supply 113, 1113 (step S808: continuous feeding unit).

The CPU 200, 1200 then determines whether or not a dial tone has been detected (step S809: other detection unit). A dial tone is a sine wave output from a public telephone network or a TA.

When the dial tone has been detected, the CPU 200, 1200 determines that there is an improper connection (YES in the step S809), and the process proceeds to the step S804 described above. On the other hand, when the dial tone has not been detected, the CPU 200, 1200 determines that a phone is properly connected (NO in the step S809) and terminates the present process. The timing with which a dial tone is detected will be described later.

Figure 8A:
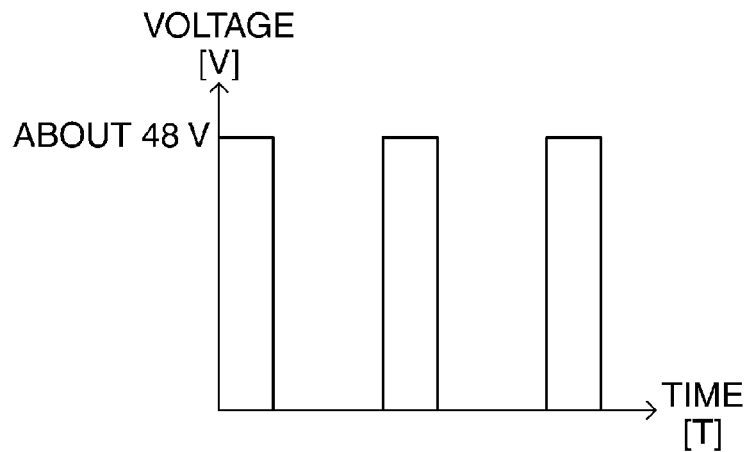
FIG. 8A is a diagram useful in explaining intermittent power feeding.
Figure 8B:
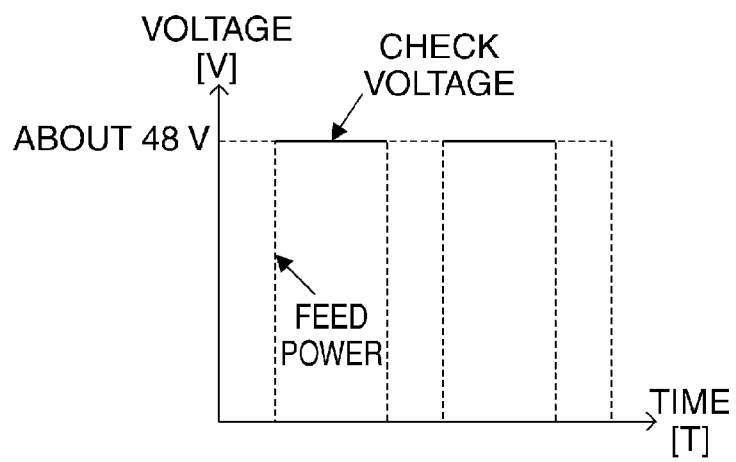
FIG. 8B is a diagram showing the timing with which a value of a voltage is obtained.
Figure 8C:
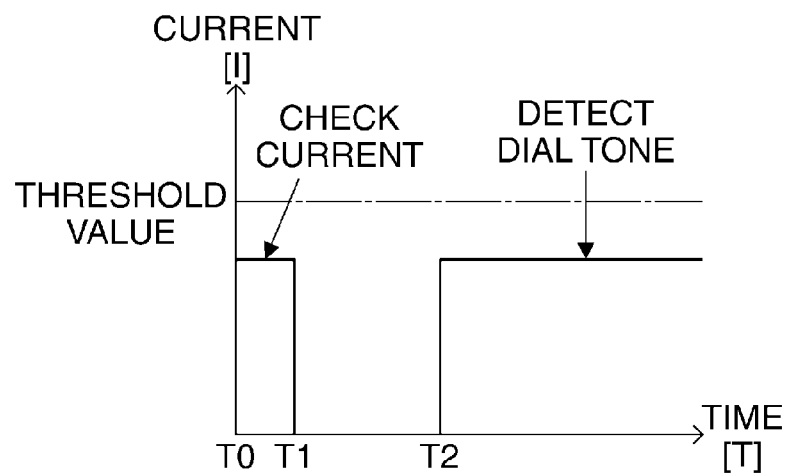
FIG. 8C is a diagram showing the timing which a value of a current is obtained and the timing with which a dial tone is detected.

FIG. 8A is a diagram useful in explaining intermittent power feeding, FIG. 8B is a diagram showing the timing with which a value of a voltage is obtained, and FIG. 8C is a diagram showing the timing which a value of a current is obtained and the timing with which a dial tone is detected.

In graphs shown in FIGS. 8A to 8C, the axis of abscissa indicates time. Among the graphs shown in FIGS. 8A to 8C, the axis of ordinate in the graphs in FIGS. 8A and 8B indicates voltage, and the axis of ordinate in the graph in FIG. 8C indicates current.

FIG. 8A shows how power is intermittently fed at about 48 V at regular time intervals. In the step S801 described above, power is intermittently fed in this way. FIG. 8B shows that a value of a voltage is obtained at times when no power is fed. Thus, in the step S802 described above, a value of a voltage is obtained at times when no power is fed.

FIG. 8C shows that a value of a current is obtained at times T0 to T1, and a dial tone is detected at T2 and onwards. Thus, in the step S807, a value of a current supplied from the DC power supply 113, 1113 is obtained at times T0 to T1, and in the step S809, a dial tone is detected at T2 and later.

As a result of the improper connection control process in FIG. 7, improper connection of a modular cable, which is connected to a public telephone network or a TA, to the phone interface 129, 1129 is recognized while power is fed to the phone interface 129, 1129, and a dial tone is detected, and this prevents occurrence of failures in the facsimile apparatus 100 and the IP-FAX apparatus 1100.

In the embodiment described above, a screen indicating that there is a possibility of improper connection is displayed on the display 119, 1119 to provide notification to the user, but alternatively, for example, an LED which lights up when there is a possibility of improper connection may be used.

According to the present embodiment, a voltage applied to the phone interface 129, 1129 is detected (the step S401), and it is determined whether or not a value of the detected voltage is equal to or greater than a value determined in advance (the step S402). When the value of the detected voltage is equal to or greater than a value determined in advance (Yes in the step S402), the user is notified that there is a possibility of improper connection (step S403), occurrence of events such as failures caused by improper connection is prevented to a greater extent as compared to conventional arts.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-072492, filed Mar. 31, 2014, which is hereby incorporated by reference herein in its entirety.

What is claimed is:

1. A communication apparatus comprising:
an interface for connecting a phone;
a power feeding unit configured to feed power to said interface;
a detection unit configured to detect a voltage being applied to said interface;
a determination unit configured to determine whether a value of the voltage detected by said detection unit is equal to or greater than a value determined in advance;
a notification unit configured to, when said determination unit determines that the value of the detected voltage is equal to or greater than the value determined in advance, notify a user that there is a possibility of improper connection; and
a power feeding starting unit configured to, when said determination unit determines that the value of the detected voltage is not equal to or greater than the value determined in advance, cause said power feeding unit to start feeding power.

2. The communication apparatus according to claim 1, wherein when said determination unit determines that the value of the detected voltage is equal to or greater than the value determined in advance, a current with the voltage applied to said interface is fed.

3. The communication apparatus according to claim 1, wherein at startup of the communication apparatus, said detection unit detects the voltage being applied to said interface.

4. The communication apparatus according to claim 1, wherein when said determination unit determines that the value of the detected voltage is equal to or greater than the value determined in advance, said interface is electrically disconnected.

5. The communication apparatus according to claim 1, wherein said interface is electrically disconnected in advance before said detection unit detects the voltage being applied to said interface.

6. A communication apparatus comprising:
an interface for connecting a phone;
a power feeding unit configured to feed power to said interface;
an intermittent power feeding starting unit configured to start intermittent power feeding from said power feeding unit;
a detection unit configured to, after intermittent power feeding from said power feeding unit is started by said intermittent power feeding starting unit, detect a voltage being applied to said interface at a time when no power is fed from said power feeding unit;
a determination unit configured to determine whether a value of the voltage detected by said detection unit is equal to or greater than a value determined in advance;
another determination unit configured to, when said determination unit determines that the value of the detected voltage is not equal to or greater than the value determined in advance, determine whether a value of a current being supplied from said power feeding unit is equal to or greater than a value determined in advance;
a continuous power feeding unit configured to, when said other determination unit determines that the value of current supplied from said power feeding unit is not equal to or greater than the value determined in advance, continue power feeding from said power feeding unit;
another detection unit configured to, in a state where power feeding is continued by said continuous power feeding unit, detect a sine wave determined in advance in said interface; and
a notification unit configured to, when said determination unit determines that the value of the detected voltage is equal to or greater than the value determined in advance, said other determination unit determines that the value of the current being supplied from said power feeding unit is equal to or greater than the value determined in advance, and said detection unit detects the sine wave determined in advance, stop feeding power to said interface and notify a user that there is a possibility of improper connection.

7. A control method for a communication apparatus which has an interface for connecting a phone, and a power feeding unit that feeds power to the interface, comprising:
a detection step of detecting a voltage being applied to the interface;
a determination step of determining whether a value of the voltage detected in said detection step is equal to or greater than a value determined in advance;
a notification step of, when it is determined in said determination step that the value of the detected voltage is equal to or greater than the value determined in advance, notifying a user that there is a possibility of improper connection; and
a power feeding starting step of, when it is determined in said determination step that the value of the detected voltage is not equal to or greater than the value determined in advance, causing the power feeding unit to start feeding power.

8. A control method for a communication apparatus which has an interface for connecting a phone, and a power feeding unit that feeds power to the interface, comprising:
an intermittent power feeding starting step of starting intermittent power feeding from the power feeding unit;
a detection step of, after intermittent power feeding from the power feeding unit is started in said intermittent power feeding starting step, detecting a voltage being applied to the interface at a time when no power is fed from the power feeding unit;
a determination step of determining whether a value of the voltage detected in said detection step is equal to or greater than a value determined in advance;
another determination step of, when it is determined in said determination step that the value of the detected voltage is not equal to or greater than the value determined in advance, determining whether a value of a current being supplied from the power feeding unit is equal to or greater than a value determined in advance;
a continuous power feeding step of, when it is determined in said determination step that the value of current supplied from the power feeding unit is not equal to or greater than the value determined in advance, continue power feeding from the power feeding unit;
another detection step of, in a state where power feeding is continued in said continuous power feeding step, detecting a sine wave determined in advance in the interface; and
a notification step of, when it is determined in said determination step that the value of the detected voltage is equal to or greater than the value determined in advance, it is determined in said determination step that the value of the current being supplied from the power feeding unit is equal to or greater than the value determined in advance, and the sine wave determined in advance is detected in said detection step, stopping feeding power to the interface and notifying a user that there is a possibility of improper connection.

9. A non-transitory computer-readable storage medium storing a program for causing a computer to execute a control method for a communication apparatus which has an interface for connecting a phone, and a power feeding unit that feeds power to the interface, the control method comprising:
a detection step of detecting a voltage being applied to the interface;
a determination step of determining whether a value of the voltage detected in the detection step is equal to or greater than a value determined in advance;
a notification step of, when it is determined in the determination step that the value of the detected voltage is equal to or greater than the value determined in advance, notifying a user that there is a possibility of improper connection; and
a power feeding starting step of, when it is determined in the determination step that the value of the detected voltage is not equal to or greater than the value determined in advance, causing the power feeding unit to start feeding power.

10. A non-transitory computer-readable storage medium storing a program for causing a computer to execute a control method for a communication apparatus which has an interface for connecting a phone, and a power feeding unit that feeds power to the interface, the control method comprising:
an intermittent power feeding starting step of starting intermittent power feeding from the power feeding unit;
a detection step of, after intermittent power feeding from the power feeding unit is started in the intermittent power feeding starting step, detecting a voltage being applied to the interface at a time when no power is fed from the power feeding unit;

a determination step of determining whether a value of the voltage detected in the detection step is equal to or greater than a value determined in advance;

another determination step of, when it is determined in the determination step that the value of the detected voltage is not equal to or greater than the value determined in advance, determining whether a value of a current being supplied from the power feeding unit is equal to or greater than a value determined in advance;

a continuous power feeding step of, when it is determined in the determination step that the value of current supplied from the power feeding unit is not equal to or greater than the value determined in advance, continue power feeding from the power feeding unit;

another detection step of, in a state where power feeding is continued in the continuous power feeding step, detecting a sine wave determined in advance in the interface; and a notification step of, when it is determined in the determination step that the value of the detected voltage is equal to or greater than the value determined in advance, it is determined in the determination step that the value of the current being supplied from the power feeding unit is equal to or greater than the value determined in advance, and the sine wave determined in advance is detected in the detection step, stopping feeding power to the interface and notifying a user that there is a possibility of improper connection.

* * * * *